United States Patent Office 3,740,346
Patented June 19, 1973

3,740,346
TREATMENT OF GRANULATED FERTILISERS
Jacques Sarrade-Loucheur, Le Pecq, France, assignor to Blancs Mineraux de Paris, Paris, France
No Drawing. Filed July 27, 1970, Ser. No. 58,657
Claims priority, application France, July 31, 1969, 6926433
Int. Cl. C09k 3/22
U.S. Cl. 252—384                    10 Claims

ABSTRACT OF THE DISCLOSURE

This invention relates to the treatment of granulated fertilisers and has two objects, viz: prevention of massing or agglomeration of the granules on piling and, secondly, the prevention of the formation and flying away of dust. These objects are achieved by applying to the granules an aqueous solution comprising from 0.1 to 10% of an organic product adapted to retain the water of solution by the coating charge and from 0.1 to 10% of an anti-clumping agent. The anti-clumping agent may be a fatty amine or diamine or derivatives thereof and the organic retaining product is generally a vegetable gum, e.g. guar resin, starch which may be pre-gelled or esterified, gelatine, saccharose or a saccharose derivative.

---

The present invention relates to a product which inhibits the formation of dust, in the treatment of granulated manures, wastes or fertilisers, hereinafter referred to simply as fertilisers.

It is known to avoid the massing or agglomeration of the fertiliser granules by coating them with a pulverulent mineral charge such as a chalk or a kaolin clay. This charge may be treated, if desired, by a fatty acid and/or a nitrogenous product or a surface-active agent for increasing its anti-clumping effect.

But the use of such charges presents the drawback that much dust is detached during the coating treatment of the fertiliser and during the various manipulations thereof. This drawback is still more aggravated when the coating charge has itself been treated as indicated above for increasing its anti-clumping effect.

During tests which have been made previously with the object of protecting granulated fertilisers against massing or agglomeration, it has been proposed to coat the granulated fertilisers with pulverulent mineral charges which have been previously treated either with aqueous solutions of polyalcohols or cellulosic derivatives, or with very concentrated aqueous solutions of hygroscopic salts (NaCl or CaCl$_2$) which may contain, moreover, adjuvants or catalysts such as fatty amides or mineral gelatinous supports. The moisture introduced into the coating charge with these treatment solutions may have, in certain cases, the secondary effect of decreasing the detachment of dust during the coating treatment of the fertiliser with the charge thus treated, or during later manipulations of the fertiliser. In any case, seeing that the main effect desired was to protect the fertiliser against massing or agglomeration, generally, it was sought to improve the coating of the granular material for establishing a hygroscopic barrier having as small as possible a humidity level so that the problem of the dust produced by the coating charge flying away again, was very imperfectly resolved.

The invention thus has for a particular object the efficacious resolution of this problem by means of a product for treating granulated fertilisers which considerably reduces the evolution of dust whilst maintaining or improving the anti-clumping effect of the pulverulent charges.

Hereinafter the expression "coating charges for the fertiliser" shall signify all pulverulent mineral charges such as chalk or a finely divided kaolin clay utilised for coating the granules of the fertiliser with the object of preventing them massing or aglomerating, this charge having been previously treated or not for increasing its own anti-clumping effect.

The treatment product according to the invention consists of an aqueous solution comprising from 0.1 to 10% of an organic product favouring the retention of the water of solution by the coating charge and from 0.1 to 10% of an anti-clumping agent selected from the fatty amines or diamines or derivatives thereof.

The treatment of granulated fertilisers by means of the solution indicated above has for a first effect to associate the water with the coating charge for the granulated fertilisers and to reduce the evolution or flying away of dust. But, in contradistinction to what one would have feared, this water does not favour the massing or agglomeration of the fertiliser whilst it is being piled or stacked. In fact, the organic product of this treatment solution ensures the retention of the water by the charge and stabilises the humidity of the latter to a level which actually may be higher than the normal level of moisture recovery of the charge when it is piled under normal conditions.

Amongst the organic products which are suitable, reference may particularly be made to starch pre-gelled starch, etherified or esterified starch, gelatine, saccharose and its derivatives such as sorbitol and sorbose and, above all, natural vegetable resins, such as guar resin.

Guar resin is a polysaccharide that is rich in the hydroxy extracts of a leguminous plant originating in Pakistan. It exerts a retention effect which is very efficacious even when it is in a weak proportion in the solution and it dissolves very easily in water at a temperature of about 70–90° C.

The anti-clumping agent incorporated in the treatment solution may be one of the derivatives of the fatty amines soluble in water, such as one of the polyoxyethylenic derivatives or a salt of a fatty amine acid, such as an acetic salt of amino stearoyl or a polyoxyethylenated diamino stearoyl. This agent may be employed in very weak doses for maintaining and even improving the actual anti-clumping effect of the mineral charge used for coating the fertiliser. With weak doses of the guar resin and the anti-clumping agent, the treatment solution has, at the temperature of use, a very small viscosity approaching that of water, which permits it being easily sprayed on the fertiliser before, during or after its coating by the mineral charge. The anti-clumping agents of the type indicated above, moreover, have a bactericidal and fungicidal effect, permitting the avoidance of the destruction of the retention product by micro-organisms at the time of piling the treated fertilisers.

The treatment solution according to the invention may also comprise a surface-active agent having the advantage of giving to the solution an anti-dust-forming efficiency which is very much increased with smaller doses of the solution with reference to the mass of the fertiliser. This effect is obtained due to the appreciable decrease in the superficial tension of the solution treatment by the formation of films which are very much more tenuous. Moreover, without losing its efficiency, the concentration of the constituents dissolved in the solution may also be decreased whilst retaining a better efficiency. These surface-active products may be used at concentrations of from 0.01 to 2%.

As regards the surface-active agent, there may be used, for example, a quaternary ammonium salt having one or two fatty chains or a surface-active agent having both an anionic and a cationic function, that is to say, containing, on the one hand, one or more primary or secondary amine functions and, on the other hand, an organic acid function or a metal salt of this organic acid, all these functions being fixed separately on the carbonaceous chain of a fatty radical comprising from 8 to 21 carbon atoms. In the latter case, by the amphoteric effect of this anionic and cationic agent, a better dispersion can be obtained as well as a decrease in the dosage of this surface-active agent in the solution. On the other hand, this agent has the advantage of possessing a corrosion-inhibiting effect so that it is no longer necessary to take any particular precautions for the materials constituting the vat or the piping, pumps and injectors of the spraying apparatus for the treatment solution.

The quantity of solution to be used with a granulated fertiliser varies in dependence upon its concentration, on the nature of the charge, and of the fertiliser, and also with respect to its conditions of use but, generally, there are used between 0.01 and 0.5 part by weight of the treatment solution for 100 parts of the fertiliser.

Several examples of carrying the invention into effect will hereinafter be indicated in the specific examples.

EXAMPLE I

An aqueous treatment solution is made comprising 0.2% of guar resin and 0.1% of amino stearoyl acetate. 3% of this treatment solution is sprayed on an anti-clumping charge constituted by a kaolin clay that is finely divided and treated with 1% of amino stearoyl.

The charge thus treated is used for coating a granulated fertiliser, nitrogen 17, phosphorus 17, potassium 17, in which the nitrogen is present in the form of ammonium nitrate and urea.

EXAMPLE II

The granulated fertiliser 17, 17, 17 is directly treated with the treatment solution according to Example I by spraying 0.2% of the solution with reference to the weight of the fertiliser and then the granules of fertiliser are coated with 1% of the charge constituted by the finely divided kaolin clay, itself treated with 1% of amino stearoyl.

EXAMPLE III

2% of the treatment solution according to Example I is sprayed on an anti-clumping charge constituted by finely divided chalk and then this charge is treated with 1% of amino stearoyl. A granulated ammonium nitrate fertiliser having 34.5% nitrogen is coated with this charge, i.e. 2% of the charge with reference to the fertiliser.

Alternatively, the solution may first be sprayed on the fertiliser and then the latter may be coated with the treated charge.

With the products obtained as a result of the treatments described in the preceding examples, the detachment of dust is considerably diminished or suppressed and no tendency to massing or agglomeration has been observed when the products have been submitted to the usual test treatments or after piling for two months in polyethylene sacks.

EXAMPLE IV

An aqueous treatment solution is made comprising 0.5% of guar resin and 5% of an amino acetate such as an acetic salt of amino stearoyl.

This solution may be sprayed on the fertiliser before, during or after the coating of the fertiliser with the charge.

Apart from the improvement of the action against clumping, a complete suppression of dust was observed.

EXAMPLE V

An aqueous spraying solution was made containing 0.5% of guar resin, 1% amino stearoyl acetate and 2% of quaternary ammonium salts having one or two fatty chains.

EXAMPLE VI

A spraying solution was made containing 0.5% of guar resin, 1% of amino stearoyl acetate and 0.1% propionoyl-diamino stearoyl or its sodium salt.

The solutions of the two preceding examples may be sprayed on the granulated fertiliser in doses from 0.01 to 0.5 per hundred of fertiliser together with the coating by the anti-clumping mineral charge before, during or after this coating. The production of dust is practically suppressed as a result.

The treatment solutions according to the invention may be put up commercially in a concentrated form so that they may be subsequently diluted.

I claim:

1. An anti-agglomerating and dust-suppressing composition for the treatment of a granulated fertiliser, said composition consisting essentially of an aqueous solution having dissolved therein (a) from 0.1% to 10.0% by weight of a water-soluble water retention substance selected from the group consisting of starch, gelatine, saccharose, sorbitol, sorbose and guar resin and (b) from 0.1% to 10.0% by weight of a water-soluble anti-clumping agent selected from the group consisting of amino fatty acid acetate and polyoxyethylenated amino fatty acids.

2. The composition of claim 1 which also includes from 0.1% to 2.0% by weight of a surface active agent which decreases the surface tension of the solution.

3. The composition of claim 1 in which said salt is stearylamine acetate.

4. The composition of claim 1 in which said saccharic substance is guar resin.

5. The composition of claim 3 in which said saccharic substance is guar resin.

6. The composition of claim 2 in which said surface active agent is N-(stearylamino)-$\beta$-aminopropionic acid or its sodium salt.

7. The composition of claim 2 in which said substance is guar gum.

8. The composition of claim 6 in which said substance is guar resin.

9. The composition of claim 2 in which said water-soluble derivative of an amine is a water-soluble polyoxyethylenated stearylene diamine.

10. The composition of claim 9 in which said substance is guar gum.

References Cited

UNITED STATES PATENTS

| 3,250,607 | 5/1966 | Sawyer et al. | 71—28 |
| 3,206,297 | 9/1965 | O'Connor | 71—28 |
| 3,186,828 | 6/1965 | Baarson | 71—28 |

FOREIGN PATENTS

| 1,043,405 | 9/1966 | Great Britain. |

OTHER REFERENCES

Japan Pat. No. 1,879/62 in Derwent Japanese 10.5.62–16.5.62, vol. 1, No. 16, General Organic, p. 5.

MAYER WEINBLATT, Primary Examiner

I. GLUCK, Assistant Examiner

U.S. Cl. X.R.

71—28, 30; 252—383